(12) United States Patent
How

(10) Patent No.: US 9,602,587 B2
(45) Date of Patent: Mar. 21, 2017

(54) MULTIPLE PLANE NETWORK-ON-CHIP WITH MASTER/SLAVE INTER-RELATIONSHIPS

(71) Applicant: Altera Corporation, San Jose, CA (US)

(72) Inventor: Dana How, Palo Alto, CA (US)

(73) Assignee: Altera Corporation, San Jose, CA (US)

( * ) Notice: Subject to any disclaimer, the term of this patent is extended or adjusted under 35 U.S.C. 154(b) by 156 days.

(21) Appl. No.: 14/316,400

(22) Filed: Jun. 26, 2014

(65) Prior Publication Data

US 2015/0381707 A1 Dec. 31, 2015

(51) Int. Cl.
*G06F 15/16* (2006.01)
*H04L 29/08* (2006.01)
*H04L 12/721* (2013.01)

(52) U.S. Cl.
CPC .............. *H04L 67/10* (2013.01); *H04L 45/06* (2013.01)

(58) Field of Classification Search
None
See application file for complete search history.

(56) References Cited

U.S. PATENT DOCUMENTS

| | | | | |
|---|---|---|---|---|
| 2006/0041889 A1* | 2/2006 | Radulescu | .............. | H04L 47/10 719/313 |
| 2006/0209846 A1* | 9/2006 | Clermidy | ................ | H04L 12/56 370/400 |
| 2007/0253410 A1* | 11/2007 | Dielissen | .............. | G06F 9/3802 370/389 |
| 2008/0043757 A1* | 2/2008 | Dielissen | .............. | G06F 9/3802 370/400 |
| 2008/0123666 A1* | 5/2008 | Ciordas | ................... | H04L 45/00 370/400 |
| 2009/0100148 A1* | 4/2009 | Murali | ..................... | H04L 47/10 709/218 |
| 2011/0103799 A1* | 5/2011 | Shacham | ............... | H04B 10/25 398/115 |
| 2014/0126572 A1 | 5/2014 | Hutton et al. | | |

(Continued)

OTHER PUBLICATIONS

Shacham, Assaf, Keren Bergman, and Luca P. Carloni. "On the design of a photonic network-on-chip." Proceedings of the First International Symposium on Networks-on-Chip. IEEE Computer Society, 2007.*

(Continued)

*Primary Examiner* — Thomas Dailey
(74) *Attorney, Agent, or Firm* — Fletcher Yoder, P.C.

(57) ABSTRACT

Systems and methods are provided herein for implementing a Network-on-Chip (NoC) in a System-on-Chip (SoC) device. In some embodiments, an NoC may include a first node that transmits data to a second node, where data may be transmitted via either a first plane or a second plane. The first plane may utilize first logic at each of an output port of the first node, an input port of the second node, and at intermediary ports when transmitting the data to the second node. The second plane may utilize first logic at the output port of the first node and at the input port of the second node when transmitting the data to the second node, and may utilize second logic that is different from the first logic at the intermediary ports when transmitting the data to the second node.

17 Claims, 11 Drawing Sheets

(56) References Cited

U.S. PATENT DOCUMENTS

2015/0331831 A1* 11/2015 Solihin ................ H04L 49/109
 709/212

OTHER PUBLICATIONS

Dally, "Virtual-Channel Flow Control," IEEE Transactions on Parallel and Distributed Systems, vol. 3, No. 2, Mar. 1992, pp. 194-205.
"Designing Network On-Chip Architectures in the Nanoscale Era," (Jose Flich and Davide Bertozzi, editors), published by Chapman & Hall / CRC Computational Science Series, copyright 2011, 490 pages.

* cited by examiner

MULTIPLE PLANE NETWORK-ON-CHIP WITH MASTER/SLAVE INTER-RELATIONSHIPS

BACKGROUND OF THE INVENTION

A System-on-Chip (SoC) is a large silicon chip implementing an entire subsystem comprising numerous subcomponents. A Network-on-Chip (NoC) provides a standard interconnection scheme for large, possibly standardized components in a System-on-Chip. Without an NoC, these subcomponents would be connected in ad-hoc ways, utilizing numerous ad-hoc interfaces on the subcomponents. Such ad-hoc configuration makes it difficult to route the overall chip properly and meet timing requirements. With a Network-on-Chip, each subcomponent is designed to, and verified against, an interface with known, fixed properties, and later the interconnect is customized and/or synthesized to tie these subcomponents together into an overall system.

Generally, an NoC implements point-to-point connections, and the desired service properties may vary from connection to connection. At one extreme, a connection could be a completely provisioned, dedicated connection with so-called "Guaranteed Traffic" (GT), and on the other extreme, a connection could utilize shared bandwidth to transmit packetized data with variable latency on a so-called "Best Effort" (BE) basis. The former might be useful for real-time, high-bandwidth, high-utilization streaming data, whereas the latter might be useful for signaling, status, control, and configuration purposes, all requiring much less bandwidth and mostly insensitive to variable latency.

Various schemes have been proposed to allow one network to provide both extremes of service, if not even more types in between, but these require extensive additional logic to provide the guarantees for GT while still providing BE routing capabilities and avoiding deadlock for BE. These schemes also have not been fully explored because most NoCs carry mostly packetized read/write traffic between compute and memory cores for high-performance computing applications, whereas other application areas, such as multimedia, networking, and digital signal processing (DSP), all operate on real-time streaming data.

SUMMARY

Systems and methods are provided herein for implementing a Network-on-Chip (NoC) in a System-on-Chip device in accordance with embodiments of the present disclosure. In some embodiments, an NoC may include a first node that transmits data to a second node, where data may be transmitted via either a first plane or a second plane. For example, the first node may transmit data via either a Guaranteed Traffic plane or a Best Effort (BE) plane, as appropriate. The first plane may utilize first logic at each of an output port of the first node, an input port of the second node, and at ports of intermediate nodes when transmitting the data to the second node. The second plane may utilize first logic at the output port of the first node and at the input port of the second node when transmitting the data to the second node, and may utilize second logic that is different from the first logic at the ports of intermediate nodes when transmitting the data to the second node. For example, both planes may share the same routing logic, such that costs are saved by only having one set of logic that serves to make operating decisions for both planes.

In some embodiments, the first plane may utilize a first service and the second plane may utilize a second service that is different from the first service. In some embodiments, as described in the foregoing, the first service is a Best Effort service and the second service is a Guaranteed Traffic service.

In some embodiments, the first plane may be a master plane and the second plane may be a slave plane. The master plane may dictate routing decisions of the slave plane. This may be done, for example, by using the master plane to set up the particular routing decisions utilized on the slave plane.

In some embodiments, a setup packet for the slave plane may be transmitted from the output port of the first node via the master plane to the input port of the second node. The setup packet may travel across one or more intermediate nodes en route from the first node to the second node. Each time the setup packet is received at an intermediate node, a routing decision may be stored at the intermediate node. The stored routing decisions may serve to create a virtual circuit in order to enable a Guaranteed Traffic connection. Subsequent to the setup packet reaching the second node, a data stream may be transmitted via the slave plane from the first node to the second node according to the stored routing decision at each intermediate node. When the data transmission is complete, a tear-down packet may be transmitted from the output port of the first node to the input port of the second node. The tear-down packet may serve to release resources that were previously dedicated to a Guaranteed Traffic connection such that those resources may be utilized for a best effort connection.

In some embodiments, the tear-down packet may be transmitted via the master plane, and in other embodiments the tear-down packet may be transmitted via the slave plane. For example, the tear-down packet may be transmitted via a dedicated Guaranteed Traffic connection, or via other routing logic that is not reserved for Guaranteed Traffic (e.g., via BE routing).

In some embodiments, the setup packet may contain the addresses of some or all of the intermediate nodes to be used to transmit the data from the first node to the second node. For example, the setup packet may be an Multi-Protocol Label-Switching (MPLS) packet that contains labels identifying the addresses of each node along the way.

In some embodiments, the first plane and/or the second plane may derive initial routing decisions from memories that are initialized prior to normal operation of the NoC. For example, the NoC may be pre-configured with dedicated Guaranteed Traffic connections.

Systems and methods are also provided herein for providing an NoC including a configurable array of nodes, where a node of the configurable array of nodes operates in a default operating mode until a replacement operating mode is triggered. For example, when an NoC is unconfigured, a latch bank may be initialized to "clear," such that no routing decisions are stored. This may enable a default operating mode where routing logic updates the latches' values as needed to implement required routing behavior in a dynamic fashion until configuration is performed.

In some embodiments, the default operating mode may be triggered when the NoC is powered on. For example, the latch bank of an NoC may be initialized to "clear" upon power-on of an NoC to enable dynamic routing upon power-on when configuration has not yet been performed.

In some embodiments, the replacement operating mode may be triggered when the NoC is at least one of automatically initialized or programmed in by a user. For example, configuration may begin automatically upon power-on, such that predetermined latch settings (e.g., the replacement operating mode) are utilized subsequent to the completion of automatic configuration. As another example, a user may program in latch settings to configure routing decisions as desired, and the user's programmed latch settings may replace default settings or settings that were implemented prior to initialization.

In some embodiments, the nodes of the configurable array may be operational to perform a function prior to the replacement operating mode being triggered. For example, the nodes may be operable to perform at least one of identification, testing, security, and/or configuration prior to the replacement operating mode being triggered.

In some embodiments, the nodes of the configurable array of nodes may be independently configurable. For example, the nodes may be configurable individually such that each node has different latch bank settings following configuration. The nodes may be independently configurable by at least one of manual input by a user, or automatic configuration by a processor.

In some embodiments, the node of the configurable array of nodes may be reconfigurable while the NoC is configured with and operating a user-input design. For example, if a requested guaranteed data traffic lane is requested it may be deemed appropriate to replace a user-configured routing decision of an NoC with a routing decision corresponding to the guaranteed data traffic lane.

BRIEF DESCRIPTION OF DRAWINGS

Further features of the invention, its nature and various advantages will be apparent upon consideration of the following detailed description, taken in conjunction with the accompanying drawings, in which like reference characters refer to like parts throughout, and in which.

DETAILED DESCRIPTION

Figure 1:
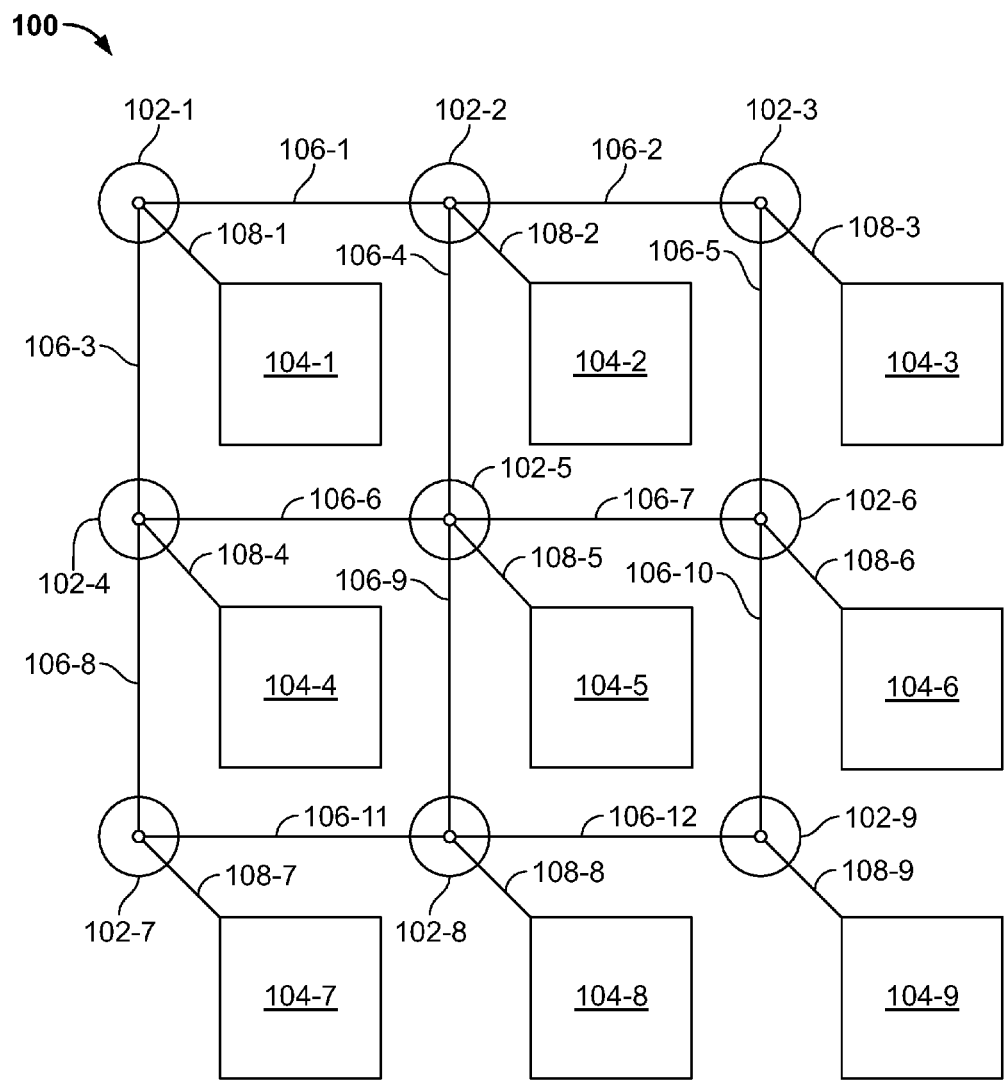
FIG. 1 depicts a Network-on-Chip including nodes, sub-blocks, links, and node-to-sub-block port interfaces for transmitting data from source nodes to destination nodes, in accordance with some embodiments of this disclosure.

FIG. 1 depicts NoC 100 including nodes 102, sub-blocks 104, links 106, and node-to-sub-block port interfaces 108. NoC 100 may be embedded in a system-on-chip. NoC 100 is depicted as a two-dimensional mesh of horizontal and vertical links. This depiction is meant to be merely illustrative, and does not limit the scope of this disclosure. For example, additional links may be added to this topology, which may result in a hypercube, torus, or butterfly topology. As another example, certain links may be removed, resulting in a star or ring topology. While this disclosure is discussed with regard to the depicted two-dimensional mesh topology, the disclosure equally contemplates and is applicable to any other topology that may implement the embodiments disclosed herein. General programmable logic devices with integrated Network-on-Chip technology are described in co-pending, commonly assigned U.S. patent application Ser. No. 14/066,425, filed Oct. 29, 2013, the disclosure of which is hereby incorporated by reference herein in its entirety.

Nodes 102 may act to switch or route data, such as, e.g., data packets or datagrams. Sub-blocks 104 may cause data to be transmitted from a source node attached via node-to-sub-block port interfaces 108 (also referred to as "port interfaces 108") to a destination node 102 via links 106. Links 106 may carry packetized traffic over one or more lanes/channels (not depicted) contained within links 106. In some embodiments, traffic at each node 102 may be divided among links 106 (or the lanes contained therein). The lanes may be used to facilitate any known type of data transmission, such as Space-Division Multiplexing, Time-Division Multiplexing or any other multiplexing technique, or any combination of any such multiplexing techniques. In some embodiments, nodes 102 contain routing logic, where decisions about how data passes through nodes 102 in order to "hop" from one link to another when being transmitted from a source sub-block 106 to a destination sub-block 106 may be determined by the routing logic of each node 102 that the data passes through.

The lanes within links 106 may be dedicated to particular end-to-end connections. Such dedicated lanes are utilized to carry so-called Guaranteed Traffic (GT) from source to destination. Guaranteed Traffic lanes are typically utilized to guarantee a required amount of bandwidth for real-time or near real-time data that would be significantly deteriorated if delayed (e.g., a video call). In some embodiments, the lanes within links 106 are not dedicated to any particular end-to-end connections. Such non-dedicated lanes are utilized to carry so-called Best Effort (BE) traffic from source-to-destination. Best Effort lanes are typically utilized for data that can withstand delay without significant deterioration.

Best Effort lanes may utilize any known scheme to referee which data should be transmitted when bandwidth at a node is being fully used, such as a round robin scheme that is agnostic to priority data in packets, a weighted round-robin scheme that factors in prioritized data when determining which data to transmit, a scheme that transmits data with full regard to priority of queued data packets, or any other scheme.

One or both of nodes 102 and port interfaces 108 may have a fixed capacity for a volume of data that is capable of passing through nodes 102 and port interfaces 108 simultaneously. Such fixed capacity of nodes 102 may be the same or different from the fixed capacity of port interfaces 108. GT and BE lanes may be utilized to referee which traffic is transmitted to a sub-block or next-hop node when a node 102 or port interface 108 has reach its fixed capacity.

Nodes 102 may be enabled to determine whether data received at nodes 102 are destined for an attached sub-block 104, or are destined for downstream nodes 102. Nodes 102 may make this determination by utilizing routing logic included within each node 102. Any known routing logic may be used. For example, node 102-4 may examine header data within a packet of a data stream to determine whether a destination field of the packet header points to a sub-block 106-4 as its ultimate destination. If the destination field does point to sub-block 106-4 of the node 102-4, then node 102-4 may transmit the packet to sub-block 106-4 via port interface 108-4. It the destination field does not point to sub-block 106-4, then node 102-4 may make a determination as to the next hop node 102 to transmit the data packet to. This determination may be made based on explicit instructions within the packet header, or may be made based on logic or tables within node 102-4 itself. Typically, routing logic within any single node 102 is ignorant as to the state of traffic at all other nodes in NoC 100, so routing decisions tend to be local in nature. Accordingly, data may be routed to a chip that is at capacity.

Figure 2:
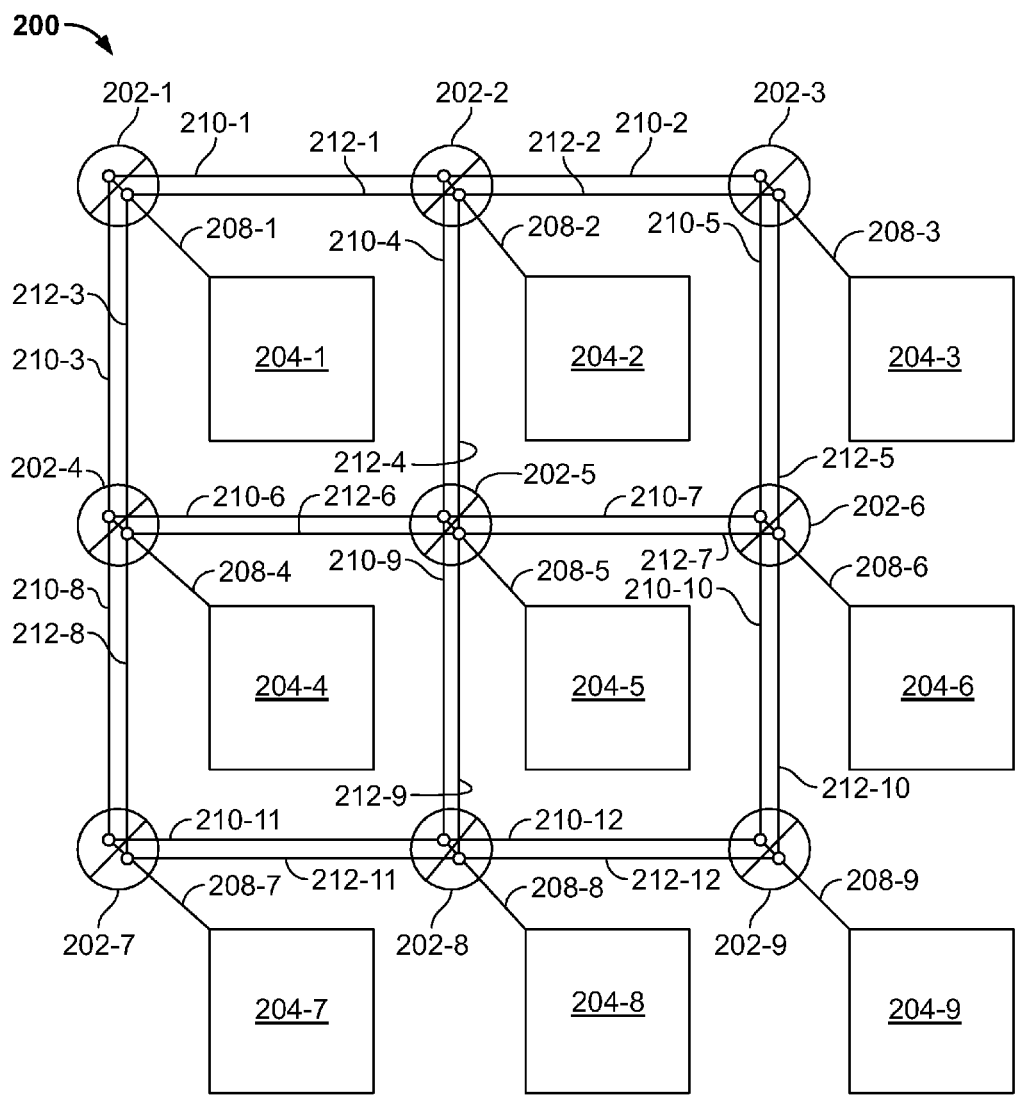
FIG. 2 depicts a Network-on-Chip including nodes, sub-blocks, links, node-to-sub-block port interfaces, and multiple planes for transmitting data from source nodes to destination nodes, in accordance with some embodiments of this disclosure.

FIG. 2 depicts NoC 200 including nodes 202, sub-blocks 204, node-to-sub-block port interfaces 208 (also referred to as "port interfaces 208"), and planes 210 and 212. NoC 200 may be embedded in a system-on-chip. NoC 200 is depicted as a two-dimensional mesh of horizontal and vertical links (e.g., planes 210 and 212, described below). This depiction is meant to be merely illustrative, and does not limit the scope of this disclosure. For example, additional links (e.g., planes 210 and 212, described below) may be added to this topology, which may result in a hypercube, torus, or butterfly topology. As another example, certain links may be removed, resulting in a star or ring topology. While this disclosure is discussed with regard to the depicted two-dimensional mesh topology, the disclosure equally contemplates and is applicable to any other topology that may implement the embodiments disclosed herein. Nodes 202, sub-blocks 204, and node-to-sub-block port interfaces 208 may implement functionality described and may be similar in form to what is described in the foregoing with regard to their counterparts in FIG. 1. Planes 210 and 212 may implement functionality and may be similar in form to what is described in the foregoing with regard to links 106, including any functionality described with respect to lanes within links 106.

Nodes 202 may be split as depicted in FIG. 2. The split may be an even or uneven split, where one portion of node 202 is utilized by plane 210, and another portion of node 202 is utilized by plane 212. Each portion of node 202 may connect with associated sub-block 204. This connection may be made via one link, as depicted, or via two or more links (not depicted), where the two or more links may be physical links (e.g., wires) or virtual links (e.g., a "mode" bit may be utilized to direct data to the appropriate portion of the node via port interface 208). While only two planes 210 and 212 are depicted, and only a two-way split in nodes 202 are depicted, this disclosure contemplates implementing three or more planes and three or more splits of nodes 202.

Each plane 210 and 212 may correspond to a different service type. For example, plane 210 may allow Best Effort traffic, and another plane may be devoted to Guaranteed Traffic. To facilitate the use of separate planes 210 and 212 that utilize separate service types, NoC 200 may organize traffic via use of virtual circuits. Any known virtual circuit technology or its NoC analog may be implemented, such as VLAN, VPLS, MPLS, and the like. The virtual circuits may be utilized to establish pre-determined paths through the network. Accordingly, for the lifetime of a virtual circuit connection, each datum that is transmitted over a virtual circuit connection may follow the same path as its predecessor.

Virtual circuits may also be utilized to reserve or provision bandwidth between source and destination nodes 202. For example, if a virtual circuit is utilized to establish a Guaranteed Traffic connection, a virtual circuit may be established to reserve an amount of bandwidth necessary to transfer the data, and then the data would be transmitted from source to destination. When the data has been fully transmitted, the virtual circuit may be torn down.

Virtual circuits may be configurable even after an NoC (e.g., NoC 200) or System-on-Chip is initialized. Setting up a virtual circuit may utilize the setup and tear-down packet functionality described above and below. When a setup packet is utilized to establish a virtual circuit, because the setup packet may rely on a Best Effort plane, establishing the virtual circuit may take a bounded but unpredictable amount of time; however, once the virtual circuit is established, the following data stream will have a dedicated path and will proceed unimpeded.

NoC 200 may be initialized with virtual circuits that are already established, perhaps after an initialization period passes. In such circumstances, a virtual circuit may always be in operation and would not require setup or tear-down packets to be operational. In such circumstances, pre-established virtual circuits may nevertheless be reconfigured by any means, such as by utilizing a setup or tear-down packet.

Each plane 210 and 212 may require some separate routing logic to be utilized. Accordingly, each node 202 may include separate routing logic required for each plane that it supports (e.g., planes 210 and 212). Some routing logic, however, may be shared between the two planes.

Figure 3:
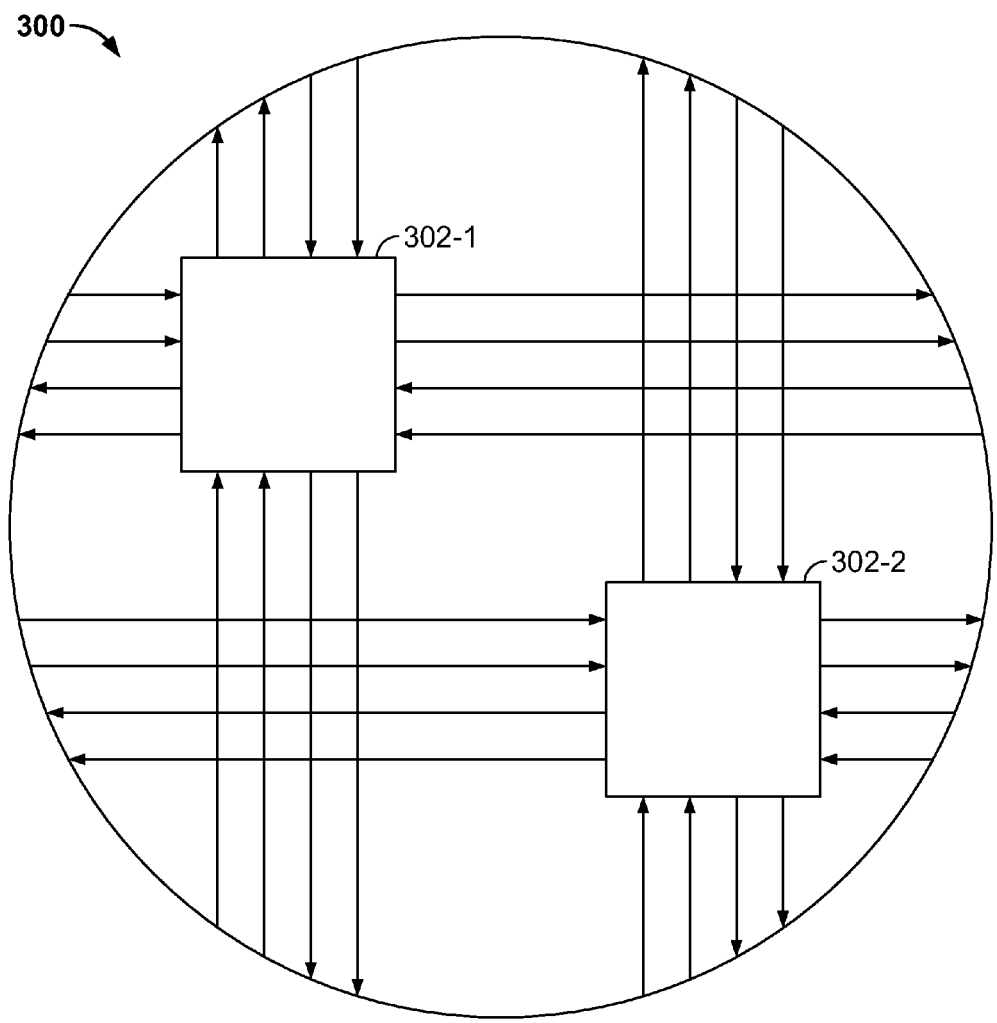
FIG. 3 depicts two nodes of a Network-on-Chip, each node including multiple channels for transmitting data between other nodes of the Network-on-Chip, in accordance with some embodiments of this disclosure.

FIG. 3 depicts a portion of NoC 300. Nodes 302-1 and 302-2 are depicted. Nodes 302-1 and 302-2 each include the same number of channels on the links between nodes (i.e., 2 channels per direction). While it is advantageous for each node 302 to include the same number of channels in order to facilitate the sharing of routing logic between planes, nodes may also include different numbers of channels. The specific number of channels depicted is merely illustrative, and any practical number of channels may be used.

The routing logic for each plane may be utilized to inspect each incoming data stream. The results of the inspection are utilized to determine the intended destination of the data stream. Based on the intended destination, the routing logic will compute a routing direction and a channel number for each data stream. In some embodiments, the routing direction will include the destination of at least one next-hop node en route to the destination. As described above and below, the inspection may include examining a packet header that specifies the destination of the packet (e.g., by way of a destination field in the packet header). The destination may be specified in an absolute manner (e.g., the address of the destination node or sub-block may be specified) or in a relative manner (e.g., one or more next-hop nodes may be specified, perhaps via a label in a VPLS or MPLS system).

Where a Best Effort connection is employed, a packet may contain a repeated header, where routing computations may be redone for each packet of a single data stream received by a node 302. Routing computations may be redone because at any given time, it may be advantageous to select a different channel for which a packet of a data stream is to be transmitted as bandwidth constraints may fluctuate rapidly. As discussed above and below, once a data transmission that utilizes a Guaranteed Traffic plane has an established path (e.g., via a setup and tear-down mechanism as described above and below), nodes may store routing decisions and will not redo routing computations for that path during the transmission of the data stream.

Figure 4:
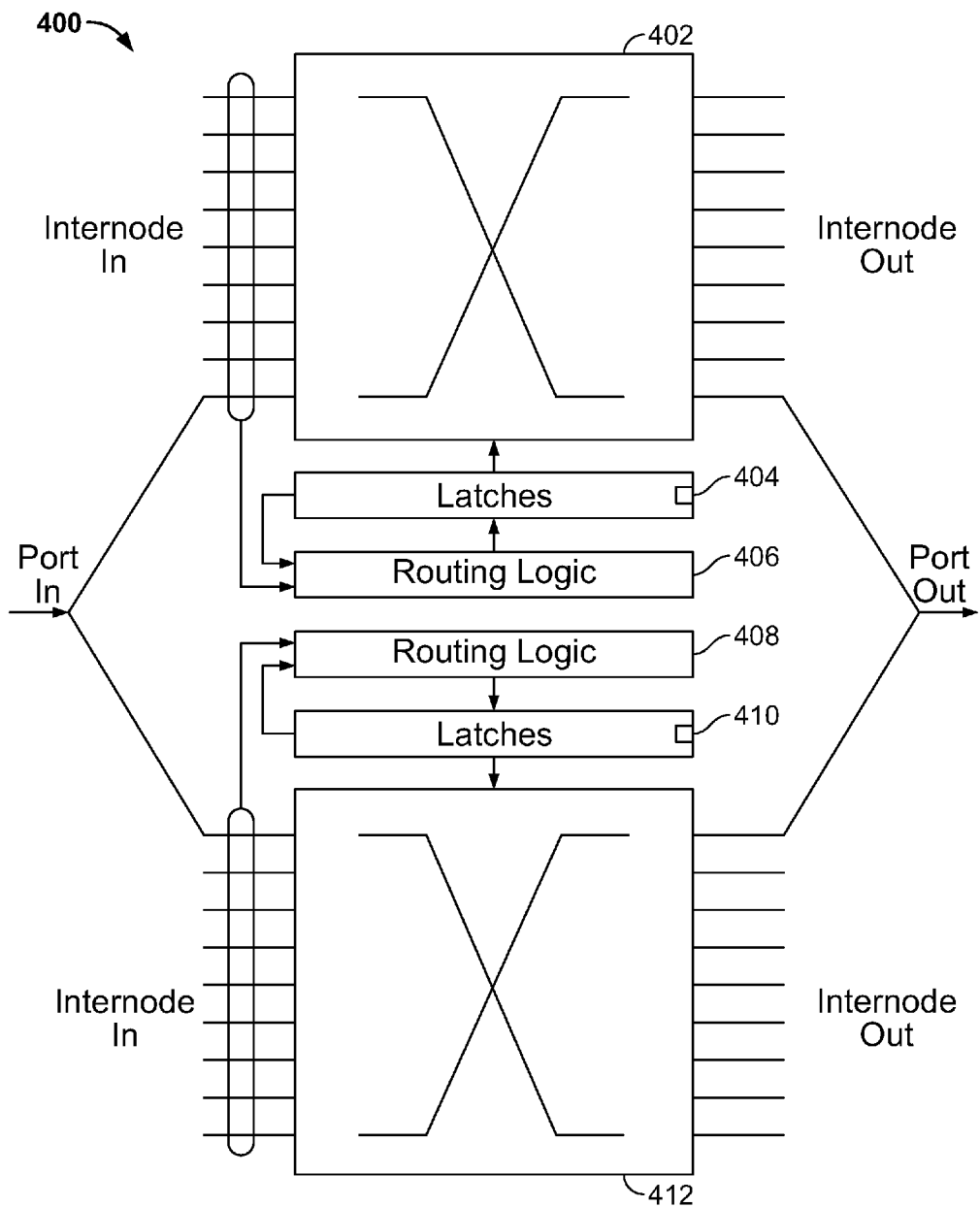
FIG. 4 depicts a node including two planes, each plane being operatively connected to its own routing logic and latches, in accordance with some embodiments of this disclosure.

FIG. 4 depicts a node 400 that utilizes two planes 402 and 412. While only two planes are depicted, this is done merely for convenience, and node 400 may include three or more planes. Plane 402 may include latches 404 and routing logic 406. Latches 404 may store routing decisions, and may control crossbar settings. Node 400 (or an NoC or SoC that node 400 is embedded on) may initialize some or all of the latches of latches 404 to a known state, which would allow the system to start operating with some connections already established. The values of the latches may be determined via routing logic 406. Any latches 404 that are initialized to a known state may be modified by routing logic 406. Routing logic 406 may make routing determinations in any manner described in the foregoing.

Plane 412 may include its own routing logic 408 and its own latches 410. Each of planes 402 and 412 may include a multiplexer (not shown) that passes data from each respective plane to each respective routing logic 406 and 408. In some embodiments, plane 402 may be a Best Effort plane and plane 412 may be a Guaranteed Traffic plane. Plane 412 requires its own routing logic because Guaranteed Traffic requires different algorithms to make routing decisions than Best Effort. For example, Best Effort routing may cause data traffic to be throttled where output capacity has been exceeded, whereas Guaranteed Traffic routing algorithms may ensure sufficient bandwidth is reserved for all data transmissions. Nevertheless, latches 410 may be configured in any manner described with regard to latches 404, and routing logic 408 may act in any manner described with regard to routing logic 406.

Figure 5:
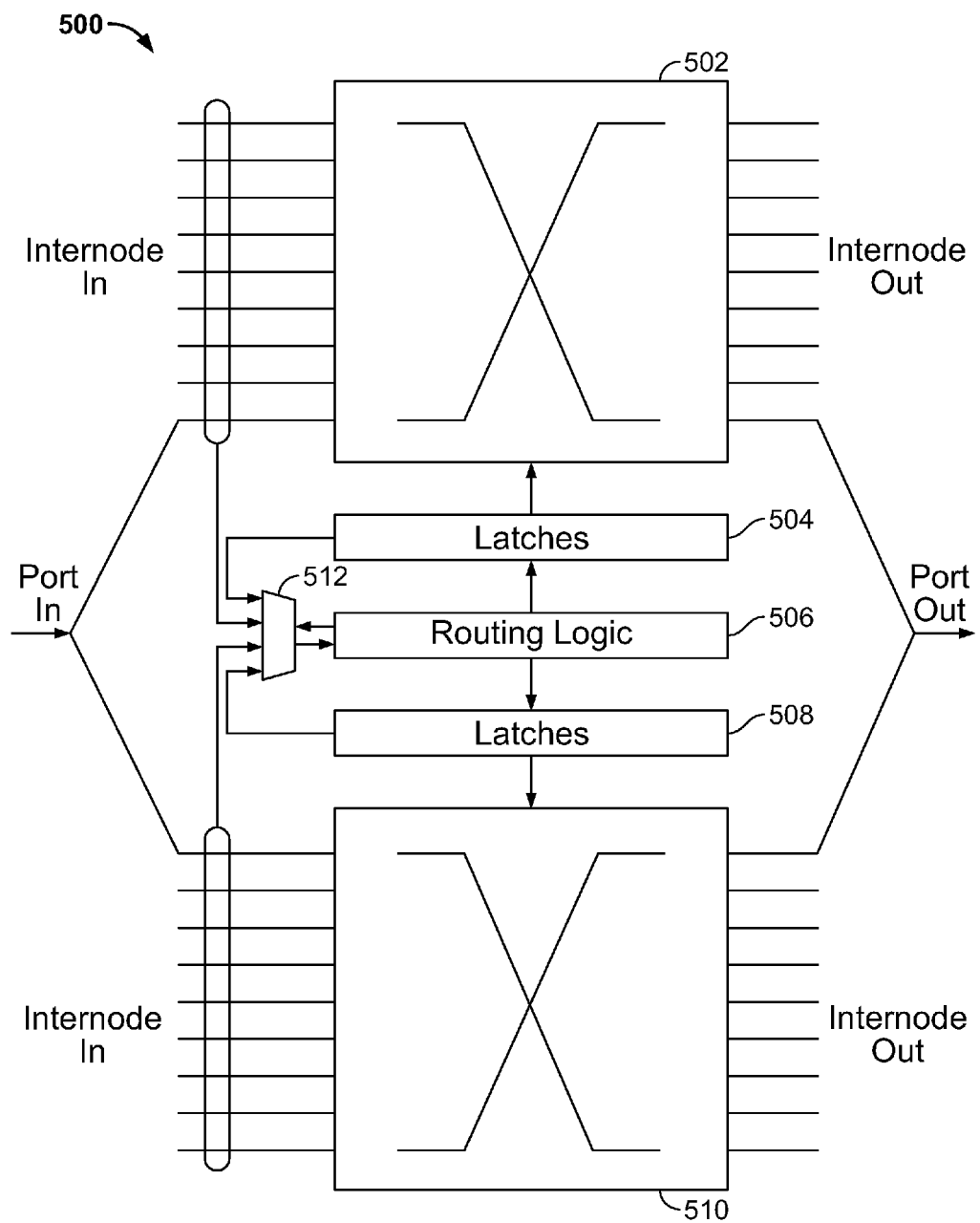
FIG. 5 depicts a node including two planes, each being operatively connected to its own latches, and each sharing one set of routing logic, in accordance with some embodiments of this disclosure.

FIG. 5 depicts node 500, which includes planes 502 and 510, latches 504, routing logic 506, and latches 508. In some embodiments, plane 502 is a Best Effort plane and plane 510 is a Guaranteed Traffic plane. Planes 502 and 510 may include a multiplexer 512 that passes data from each respective plane to routing logic 506. Routing logic 506 represents routing logic that may be shared between Best Effort plane 502 and Guaranteed Traffic plane 510. As Best Effort packets arrive at plane 502, decisions may be made by routing logic 506, and resulting routing decisions may be saved at latches 504.

In some embodiments, latches 508 may be initialized with no stored routing decisions. In order to establish a virtual circuit on Guaranteed Traffic plane 510, a setup packet may be transmitted via the Best Effort plane from the virtual circuit's source node (i.e., node 500), with a header that indicates the destination node of the virtual circuit (e.g., via a destination field within the header). In some embodiments, the fact that this packet is a setup packet (as opposed to typical data traffic) may be indicated (e.g., by setting a particular bit in the header of the setup packet). When the routing logic at node 500 detects a special packet, the routing logic may know to assess Guaranteed Traffic latches 508 —rather than Best Effort latches 504—to make a routing decision. Further, latches 508 may store the routing decisions, thereby forming a virtual circuit from source to destination. In some embodiments, latches 504 may also store the same routing decisions that form the virtual circuit from source to destination. Accordingly, packets in the data stream will follow the same path that the setup packet had created.

When the data stream has been fully transmitted across the setup virtual circuit, a tear-down packet may be transmitted across the virtual circuit. Tear-down packets, similar to setup packets, may include information that identifies that a packet is a tear-down packet (e.g., by setting a particular bit in the header of the tear-down packet). At each intermediate node along the virtual circuit, routing decisions corresponding to the virtual circuit that may be stored at latches 508 may be erased from latches 508 such that bandwidth is no longer reserved at intermediate nodes 500. Multiplexers within node 500 that facilitate data traffic may be broken down into several multiplexers, each of which drive different portions of routing logic 506. For example, routing logic 506 may be processing multiple packet headers simultaneously. Decisions for a typical packet's header may require information regarding the Best Effort latch states, while the decisions for a setup or teardown packet's header may require information regarding the Guaranteed Traffic latch states.

Best Effort plane 502 may support "source routing," where a packet header contains the address of not only the destination node, but some or all addresses of intermediate nodes along the way. By utilizing source routing, a setup packet may specify exactly what path should be set up for a Guaranteed Traffic data stream, such that routing logic 506 merely tells latches 504 and 508 to store the specified path instructions, rather than make independent decisions.

Because routing decisions in this disclosure for a Guaranteed Traffic plane tend to be made via a Best Effort plane, the Best Effort plane may be considered a master, and the Guaranteed Traffic plane may be considered a slave. The master plane may be informed by the current state of the slave plane, but may act as the sole controller of any modified state of a slave plane.

Figure 6:
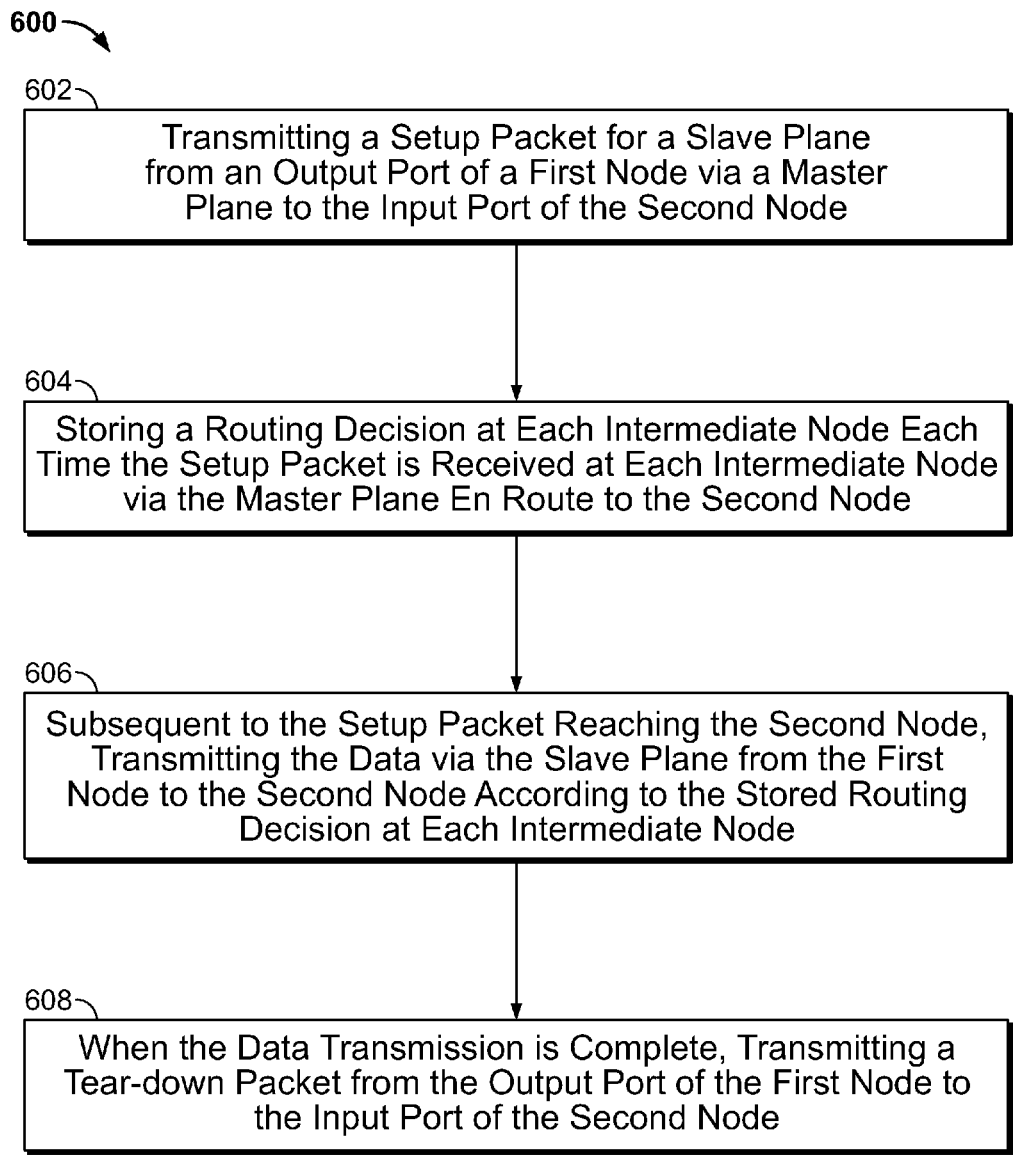
FIG. 6 depicts a flow chart for setting up a virtual circuit for transmitting a data stream via a slave plane, in accordance with some embodiments of this disclosure.

FIG. 6 depicts a flow chart 600 for setting up a virtual circuit for transmitting a data stream via a Guaranteed Traffic plane, in accordance with some embodiments of this disclosure. At 602, a setup packet may be transmitted for a slave plane from an output port of a first node via a master plane to the input port of a second node. For example, a setup packet may be transmitted from node 202-1 to node 202-9 via intermediate nodes 202-4, 202-5, and 202-6 over the Best Effort plane described with regard to FIGS. 2-5 in the foregoing.

Next, at 604, the routing decisions made at each intermediate node each time the setup packet may be received at an intermediate node via the master plane en route to the second node is stored. For example, when node 202-4 receives the setup packet, a routing decision to route the packet to node 202-5 (as opposed to node 202-7) may be made by routing logic (e.g., routing logic 406 or routing logic 506), and stored (e.g., at latches 404 and/or latches 410, or at latches 504 and/or latches 508).

Next, at 606, subsequent to the setup packet reaching the second node, data may be transmitted via the slave plane from the first node to the second node according to the stored routing decision at each intermediate node. For example, intermediate nodes 202-4, 202-5, and 202-6 may transmit data along the virtual circuit from source node 202-1 to destination node 202-9 based on information stored in latches of each node (e.g., latches 404 and/or 410, or latches 504 and 508).

At 608, when the data transmission is complete, a tear-down packet may be transmitted from the output port of the first node to the input port of the second node. For example, a tear-down packet may be transmitted from source node 202-1 to destination node 202-9 via intermediate nodes 202-4, 202-5, and 202-6. As the tear-down packet is transmitted from a node 202, information relating to the virtual circuit that is stored (e.g., at latches 404 and/or 410, or latches 504 and 508) is flushed from memory.

It should be understood that one or more elements (such as elements 602, 604, 606, and/or 608) shown in flow diagram 600 may be combined with other elements, performed in any suitable order, performed in parallel (e.g., simultaneously or substantially simultaneously), or removed. For example, elements 604 and 606 of flow diagram 600 may be performed simultaneously, or in a different order than shown in FIG. 6. Process 600 may be implemented using any suitable combination of hardware and/or software in any suitable fashion. For example, flow diagram 600 may be implemented using instructions encoded on a non-transitory machine readable storage medium.

Figure 7:
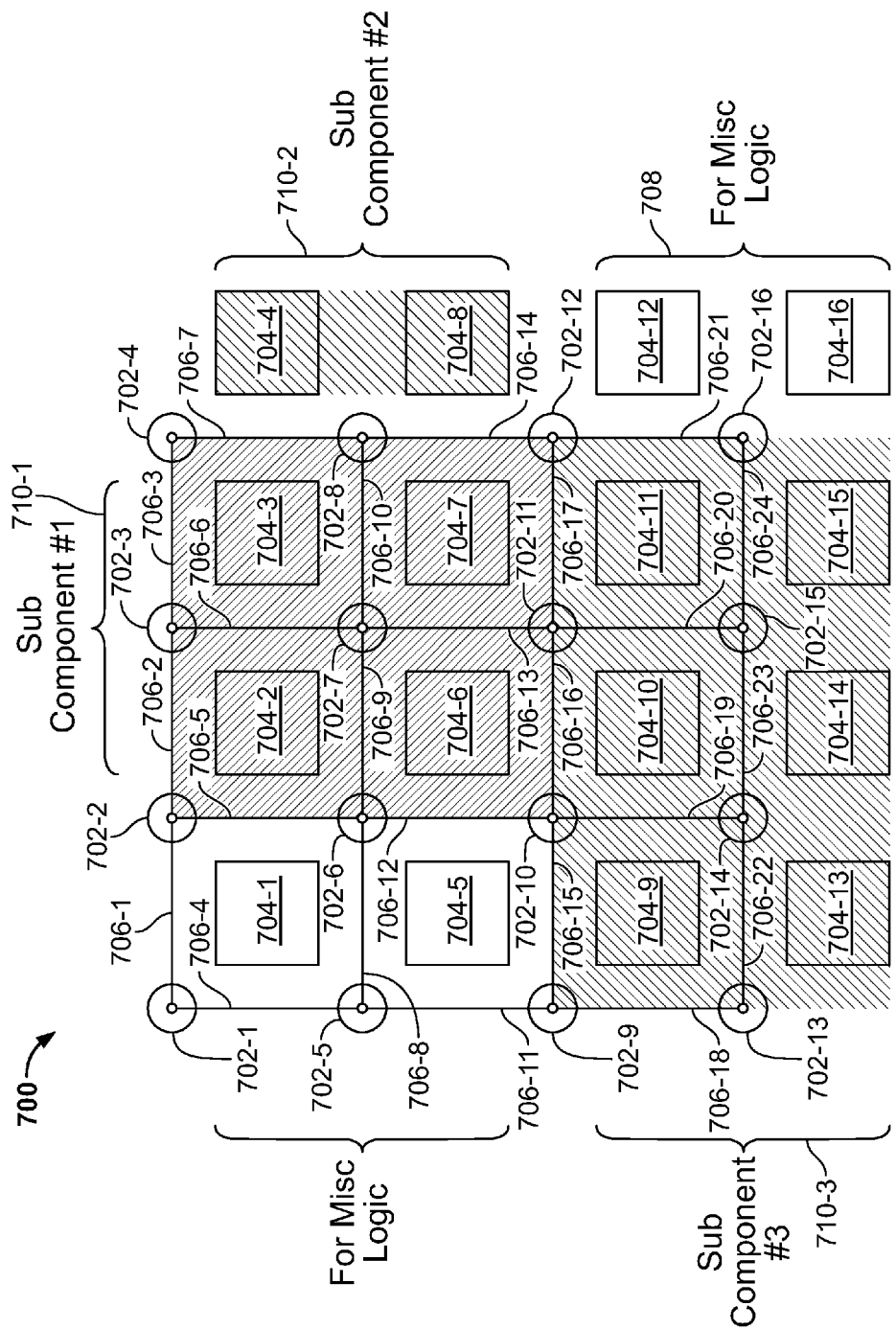
FIG. 7 depicts a Network-on-Chip including subcomponents and miscellaneous logic, in accordance with some embodiments of this disclosure.

FIG. 7 depicts NoC 700, which includes nodes 702, subcomponents 704, links 706, and miscellaneous logic 708. NoC 700 may be divided into regions 710. Regions 710 may include any number of nodes 702 and may be associated with any number of miscellaneous logic 708. In some embodiments, miscellaneous logic 708 may be reconfigurable.

In some embodiments, an SoC that an NoC (e.g., NoC 700) is embedded on may require steps of identification, testing, and/or configuration to occur before NoC 700 is configured, initialized, and ready to use.

In some embodiments, in order to perform identification, NoC 700 may determine whether variants of the chip, or its fixed subcomponents such as Inputs/Outputs ("IOs"), interface/protocol blocks, and memories, exist. If NoC 700 determines that any of these items exist, NoC 700 may identify the existing objects such that external controlling software (e.g., software for testing or configuration) ascertains how to interact with the existing objects. In some embodiments, this determination may occur via an interrogation that occurs over a communications channel. The communications channel may need to extend inwards to numerous components.

In some embodiments, in order to perform testing, before a configurable part is shipped to a customer the configurable part will undergo extensive testing to ensure it will function in the field. If redundancy is built-in, then this extensive testing has the further role of identifying which circuits should be replaced by spare circuits. In order to perform this operation, vast quantities of stimulus and response data may be loaded and unloaded from the chip. Providing a high-bandwidth communication channel for this data would shorten the overall test time and reduce testfloor time per part, which decreases the part's cost.

In some embodiments, configuration may be performed. Configurable parts may contain numerous memory bits which specify their operation. Each of these memory bits may be written into the device in order to configure the device. The speed at which this configuration is done controls a major portion of the power-on or "boot" time. Accordingly, a high-bandwidth communication channel may result in a reduced power-on or "boot" time.

In order for identification, testing, and/or configuration is to take advantage of a standard communications channel, the channel may be fully operational before the chip is configured. Putting these functions on a standard channel that remains operational after the chip is configured allows these functions to be manipulated in a standard way after the part is configured, perhaps by a loaded design itself. Furthermore, a finer granularity of an NoC may allow these functions to be accessed at a finer level of detail, thereby enabling partial reconfigurability of an NoC by a user.

As described in the foregoing, data traffic may utilize dynamic addressing by preceding data traffic with a header that indicates the destination of the data traffic. Such dynamic addressing, where address information may be embedded in the data stream itself, is fundamentally different from how data is traditionally routed in a configurable chip. For example, conventional configurable chips include configurable bits that are embedded in the routing network, the configurable bits containing a static description for a static routing configuration customized for the design mapped into the part. These bits may describe the routing configuration one bit at a time, or they may describe the routing configuration in terms of groups of bits, or, equivalently, busses. Accordingly, in such conventional configurable routing networks, the configurable bits need to be properly initialized before the configurable routing network will function properly. An NoC conventionally routes busses rather than individual bits. If, in addition, an NoC departs from the static description convention, for example via various systems and methods described in this disclosure, the NoC will be able to instead work without configuration by responding to routing information in a header of a data stream.

The approach of a conventional NoC may be inappropriate in some ways for use in a configurable chip. For example, embedding routing information in a data stream may enable that routing information to change dynamically. Such dynamism may complicate an NoC's ability to provide different service types. For example, a design may recognize that two blocks will always communicate with one another at a very high rate, and may therefore create a Guaranteed Traffic link between the two blocks. A Guaranteed Traffic link may be the equivalent of header information in a dynamic system never changing. In order to implement a Guaranteed Traffic link between two blocks in a configurable chip, header information may need to be stored in an internal NoC state, which needs to be properly initialized. This would mean that the NoC, or the portion of it providing Guaranteed Traffic, may not function until after the configurable chip, or at least the NoC, has been configured and initialized.

Methods and systems are provided herein to provide useful functions and service types (e.g., Guaranteed Traffic links) in a configurable chip before configuration occurs. In some embodiments, an NoC may contain dynamically-routed portions which function properly without configuration, as well as statically-routed portions which require configuration in order to properly function in a desired manner. In some embodiments, the dynamically-routed portions may function properly with the statically-routed portions being entirely unconfigured.

Figure 8:
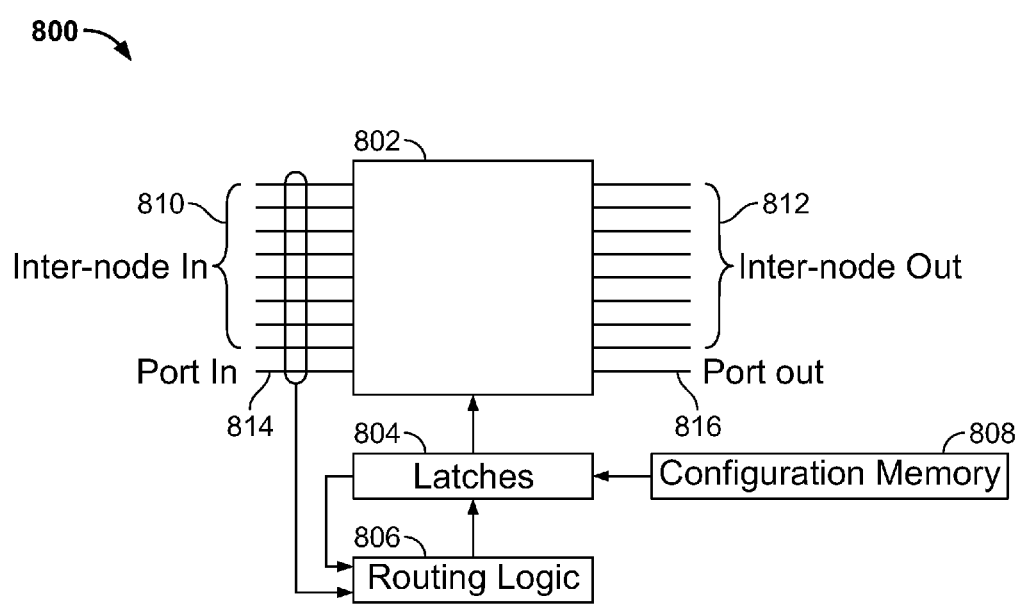
FIG. 8 depicts a subsystem of a Network-on-chip, in accordance with some embodiments of this disclosure.

FIG. 8 depicts subsystem 800, including node 802, latches 804, routing logic 806, and configuration memory 808. Node 800 may include internode input links 810 and internode output links 812. Node 800 may also include input port 814 and output port 816. Node 802 may accept data via links 810 or via port 814. Node 802 may transmit data via links 812 or port 816. Node 802 may route data according to instructions in latches 804 or according to routing logic 806. Instructions in latches 804 may be provided by routing logic 806.

Latches 804 may include a latch bank. In an unconfigured node, the latch bank may initialize to "clear," which means that no routing decisions have been made. As data packets arrive via links 810 or port 814, the header content of the data packets may be monitored via routing logic 806. Routing logic 806 may update the values of the latches to implement required routing behavior in the crossbar. By including routing logic 806 and latches 804 in NoC subsystem 800, NoC subsystem 800 may be fully operational to route data dynamically before configuration. For example, NoC subsystem 800 may be utilized to dynamically route configuration data—e.g., using packet-switching—to other components (e.g., NoC subsystems or portions of the device other than the NoC) prior to the configuration.

During configuration, NoC subsystem 800 may be initialized. Such initialization may overwrite the values of the latches with initialization values (e.g., values from configuration bits learned during initialization). Such initialization may load any desired routing pattern into the latches. The NoC implementing NoC subsystem 800 may now implement as many routes with Guaranteed Traffic as required. The desired routing pattern may utilize the same routing resources that were utilized when the node was unconfigured (e.g., links 810 and links 812, as well as latches 804, routing logic 806, and configuration memory 808). In this manner, the same resources that were utilized prior to configuration, or the same resources that were used to distribute configuration information, may be reused after configuration is complete.

Configuration bits may be inserted into an NoC node such that the original dynamic functionality of NoC subsystem 800 is retained. Configuration bits may additionally augment the dynamic functionality of NoC subsystem 800. The configuration bits may also override the dynamic functionality of NoC subsystem 800 (e.g., to provide Guaranteed Traffic). The configuration bits may be conventional configuration bits. The configuration bits may be dedicated memories. Configuration bits may reside in any known memory, such as a shift register.

Figure 9:
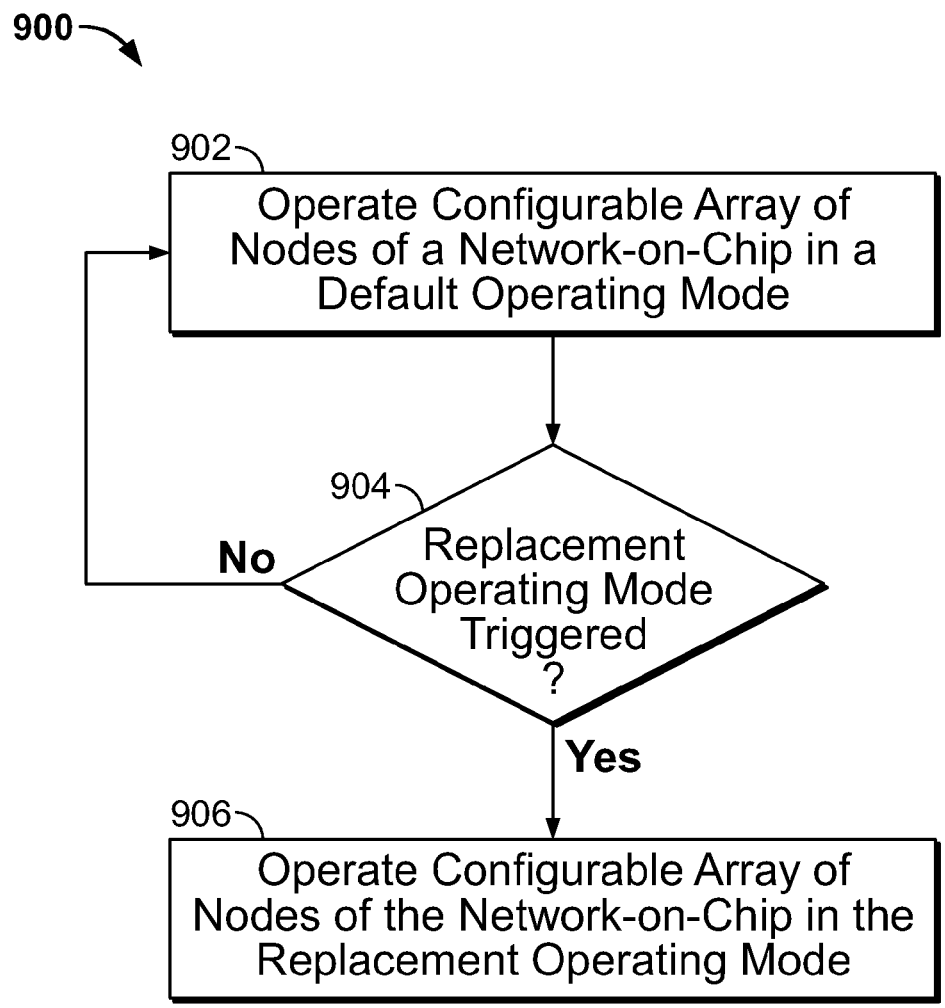
FIG. 9 depicts a flow chart for replacing a default operating mode with a replacement operating mode, in accordance with some embodiments of this disclosure.

FIG. 9 depicts flow chart 900 for replacing a default operating mode with a replacement operating mode. At 902, a configurable array of nodes of an NoC may be operated in a default operating mode. For example, nodes 702 of NoC 700 may operate in a default operating mode prior to, e.g., being configured. 904 may then be executed. At 904, it may be determined whether a replacement operating mode is triggered. For example, it may be determined whether one or more of nodes 702 of NoC 700 have been configured or initialized. A determination that one or more of nodes 702 of NoC 700 have been configured or initialized may trigger a replacement operating mode. If the replacement mode is not triggered, 902 will continue to be executed, and the configurable array of nodes may continue to operate in a default operating mode. If the replacement operating mode is triggered (e.g., one or more of nodes 702 of NoC 700 have been configured), then 906 may be executed, and the configurable array of nodes of the NoC may operate in a replacement operating mode. For example, latches 804 may be updated to reflect configured routing logic consistent with the replacement mode.

It should be understood that one or more elements (such as elements 902, 904, and 906) shown in flow diagram 900 may be combined with other elements, performed in any suitable order, performed in parallel (e.g., simultaneously or substantially simultaneously), or removed. For example, elements 902 and 904 of flow diagram 900 may be performed simultaneously, or in a different order than shown in FIG. 9. Process 900 may be implemented using any suitable combination of hardware and/or software in any suitable fashion. For example, flow diagram 900 may be implemented using instructions encoded on a non-transitory machine readable storage medium.

Figure 10:
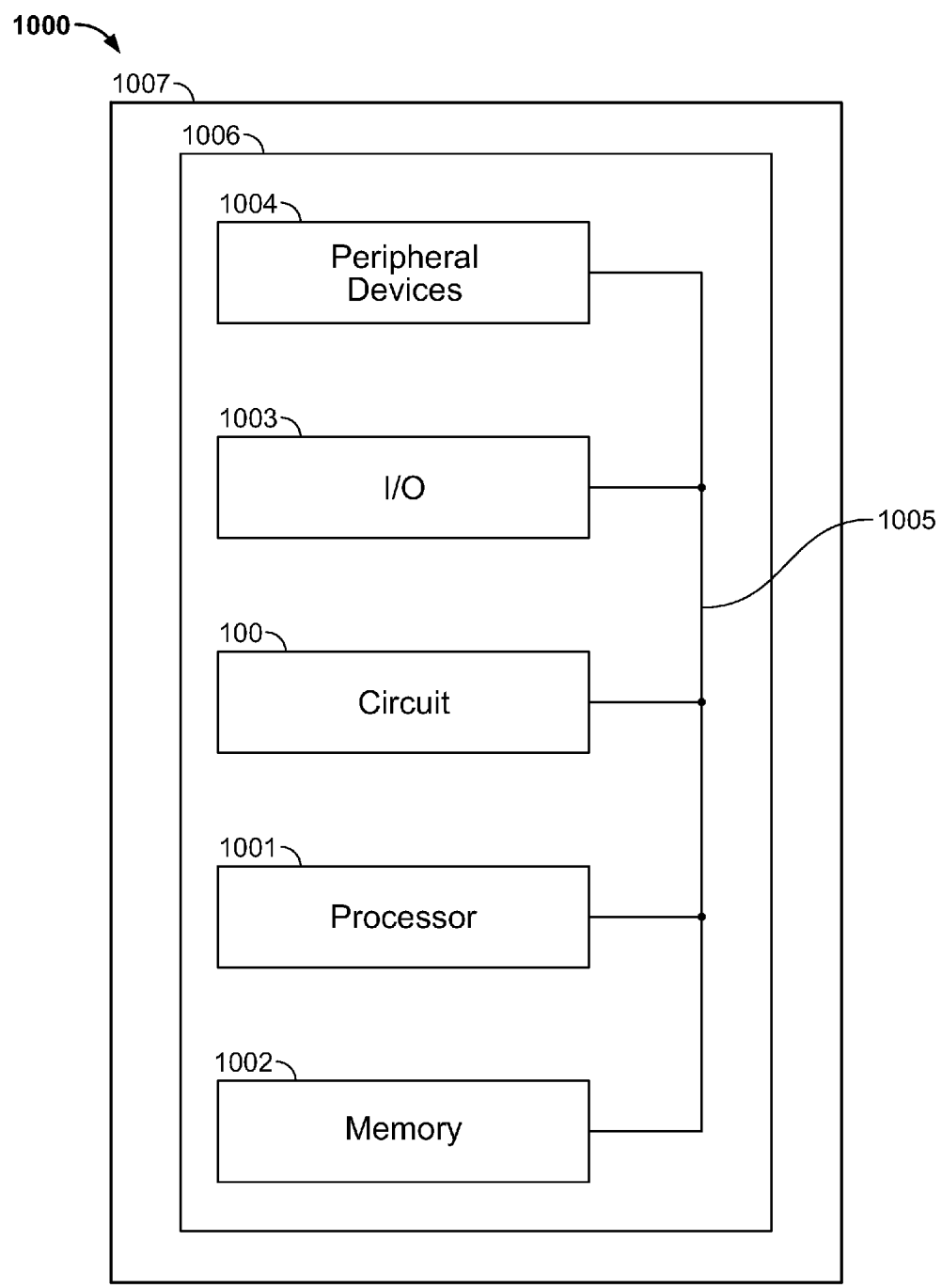
FIG. 10 is a simplified block diagram of an exemplary system employing a programmable logic device incorporating the present invention, in accordance with some embodiments of this disclosure.

As depicted in FIG. 10, an Integrated Circuit Programmable Logic Device (PLD) 1000 incorporating the multiple network planes according to the present disclosure may be used in many kinds of electronic devices. Integrated Circuit Programmable Logic Device 1000 may be an integrated circuit, a processing block, application specific standard product (ASSP), application specific integrated circuit (ASIC), programmable logic device (PLD) such as a field programmable gate array (FPGA), full-custom chip, or a dedicated chip, however, for simplicity, it may be referred to as PLD 100 herein. One possible use is in an exemplary data processing system 1000 shown in FIG. 10. Data processing system 1000 may include one or more of the following components: a processor 1001; memory 1002; I/O circuitry 1003; and peripheral devices 1004. These components are coupled together by a system bus 1005 and are populated on a circuit board 1006 which is contained in an end-user system 1007.

System 1000 can be used in a wide variety of applications, such as computer networking, data networking, instrumentation, video processing, digital signal processing, or any other application where the advantage of using programmable or reprogrammable logic is desirable. PLD 1000 can be used to perform a variety of different logic functions. For example, PLD 1000 can be configured as a processor or controller that works in cooperation with processor 1001. PLD 1000 may also be used as an arbiter for arbitrating access to a shared resource in system 1000. In yet another example, PLD 1000 can be configured as an interface between processor 1001 and one of the other components in system 1000. It should be noted that system 1000 is only exemplary, and that the true scope and spirit of the invention should be indicated by the following claims.

Various technologies can be used to implement PLDs 1000 as described above and incorporating this disclosure.

Figure 11:
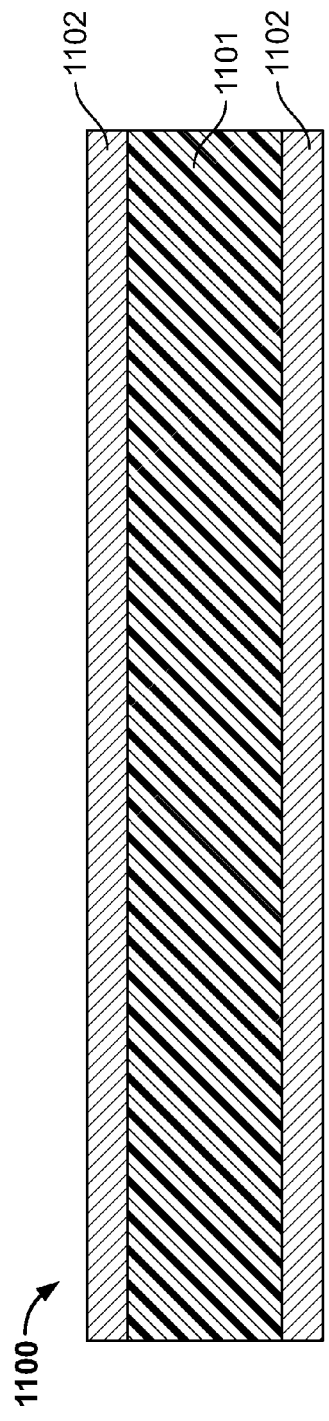
FIG. 11 is a cross-sectional view of a magnetic data storage medium encoded with a set of machine-executable instructions for performing the method according to the present invention, in accordance with some embodiments of this disclosure.

FIG. 11 presents a cross section of a magnetic data storage medium 1100 which can be encoded (e.g., a program that includes the steps of FIG. 6 and/or FIG. 9) with a machine executable program that can be carried out by systems such as a workstation or personal computer, or other computer or similar device. Medium 1100 can be a floppy diskette or hard disk, or magnetic tape, having a suitable substrate 1101, which may be conventional, and a suitable coating 1102, which may be conventional, on one or both sides, containing magnetic domains (not visible) whose polarity or orientation can be altered magnetically. Except in the case where it is magnetic tape, medium 1100 may also have an opening (not shown) for receiving the spindle of a disk drive or other data storage device.

The magnetic domains of coating 1102 of medium 1100 are polarized or oriented so as to encode, in manner which may be conventional, a machine-executable program, for execution by a programming system such as a workstation or personal computer or other computer or similar system, having a socket or peripheral attachment into which the PLD to be programmed may be inserted, to configure appropriate portions of the PLD, including its specialized processing blocks, if any, in accordance with the invention.

Figure 12:
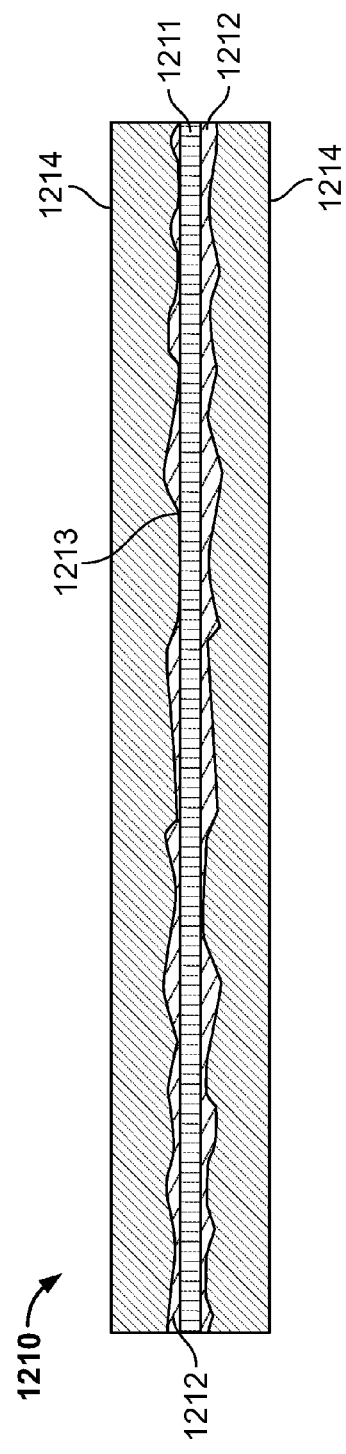
FIG. 12 is a cross-sectional view of an optically readable data storage medium encoded with a set of machine executable instructions for performing the method according to the present invention, in accordance with some embodiments of this disclosure.

FIG. 12 shows a cross section of an optically-readable data storage medium 1210 which also can be encoded with such a machine-executable program (e.g., a program that includes the steps of FIG. 6 and/or FIG. 9), which can be carried out by systems such as the aforementioned workstation or personal computer, or other computer or similar device. Medium 1210 can be a conventional compact disk read-only memory (CD-ROM) or digital video disk read-only memory (DVD-ROM) or a rewriteable medium such as a CD-R, CD-RW, DVD-R, DVD-RW, DVD+R, DVD+RW, or DVD-RAM or a magneto-optical disk which is optically readable and magneto-optically rewriteable. Medium 1210 preferably has a suitable substrate 1211, which may be conventional, and a suitable coating 1212, which may be conventional, usually on one or both sides of substrate 1211.

In the case of a CD-based or DVD-based medium, as is well known, coating 1212 is reflective and is impressed with a plurality of pits 1213, arranged on one or more layers, to encode the machine-executable program. The arrangement of pits is read by reflecting laser light off the surface of coating 1212. A protective coating 1214, which preferably is substantially transparent, is provided on top of coating 1212.

In the case of magneto-optical disk, as is well known, coating 1212 has no pits 1213, but has a plurality of magnetic domains whose polarity or orientation can be changed magnetically when heated above a certain temperature, as by a laser (not shown). The orientation of the domains can be read by measuring the polarization of laser light reflected from coating 1212. The arrangement of the domains encodes the program as described above.

It will be understood that the foregoing is only illustrative of the principles of the disclosure, and that various modifications can be made by those skilled in the art without departing from the scope and spirit of the disclosure. For example, the various elements of this disclosure can be provided on a PLD in any desired number and/or arrangement. One skilled in the art will appreciate that the present disclosure can be practiced by other than the described embodiments, which are presented for purposes of illustration and not of limitation, and the present invention is limited only by the claims that follow.

What is claimed is:

1. A Network-on-chip (NoC) operating on a programmable integrated circuit device, the NoC comprising:
   a first node that transmits data to a second node via a first plane or a second plane, wherein:
      activity on the first plane affects activity on the second plane;
      the first plane is a master plane and the second plane is a slave plane, wherein the master plane dictates routing decisions of the slave plane;
      the first plane utilizes first logic at an output port of the first node, at an input port of the second node, and at ports of intermediate nodes when transmitting the data to the second node;
      the second plane utilizes the first logic at the output port of the first node and at the input port of the second node when transmitting the data to the second node;
      the second plane utilizes second logic that is different from the first logic at the ports of the intermediate nodes when transmitting the data to the second node;
      a setup packet for the slave plane is transmitted from the output port of the first node via the master plane to the input port of the second node;
      each time the setup packet is received at an intermediate node of the intermediate nodes via the master plane en route to the second node, a routing decision is stored at the intermediate node;
      subsequent to the setup packet reaching the second node, the data is transmitted via the slave plane from the first node to the second node according to the routing decision stored at each intermediate node; and
      when the data transmission is complete, a tear-down packet is transmitted from the output port of the first node to the input port of the second node.

2. The NoC of claim 1, wherein:
   the first plane utilizes a Best Effort service; and
   the second plane utilizes a Guaranteed Traffic service.

3. The NoC of claim 1, wherein:
   the first logic is shared between the first plane and the second plane; and
   the second logic is not shared between the first plane and the second plane.

4. The NoC of claim 1, wherein the tear-down packet is transmitted via at least one of the master plane or the slave plane.

5. The NoC of claim 1, wherein:
   the first logic is utilized to determine a next node that the data is to be transmitted to in both the first plane and the second plane; and
   the second logic is utilized to determine the next node that the data is to be transmitted to in the second plane.

6. The NoC of claim 1, wherein the setup packet comprises addresses of one or more of the intermediate nodes.

7. The NoC of claim 1, wherein at least one of the first plane and the second plane derives initial routing decisions from memories which are initialized prior to normal operation of the NoC.

8. A method for operating a Network-on-Chip (NoC) on a programmable integrated circuit device, comprising:
   transmitting, using a first plane of the NoC, a setup packet from an output port of a first node through one or more intermediate nodes to an input port of a second node, wherein transmitting the setup packet comprises utilizing first logic shared between the first plane and a second plane;
   storing, using the one or more intermediate nodes, a routing decision each time one of the one or more intermediate nodes receives the setup packet en route to the second node;
   transmitting, using the second plane of the NoC, data from the output port of the first node to the input port of the second node according to the routing decision stored in the one or more intermediate nodes subsequent to the setup packet reaching the second node, wherein transmitting the data comprises utilizing second logic not shared between the first plane and the second plane; and
   transmitting a tear-down packet from the output port of the first node to the input port of the second node when transmission of the data is complete.

9. The method of claim 8, wherein:
   transmitting the data comprises transmitting the data via a slave plane; and
   transmitting the setup packet comprises transmitting the setup packet via a master plane that dictates routing decisions of the slave plane.

10. The method of claim 8, wherein transmitting the tear-down packet comprises transmitting the tear-down packet via at least one of the first plane or the second plane.

11. The method of claim 8, comprising erasing, using the one or more intermediate nodes, the routing decision each time one of the one or more intermediate nodes receives the tear-down packet en route to the second node.

12. The method of claim 8, wherein the setup packet comprises addresses of some or all of the one or more intermediate nodes.

13. A, tangible, non-transitory machine-readable medium that stores instructions executable by one or more processors of a programmable integrated circuit device to operate a Network-on-Chip (NoC), the instructions comprising instructions to:

instruct, using the one or more processors, a first plane of the NoC to transmit a setup packet utilizing a Best Effort service from an output port of a first node through one or more intermediate nodes to an input port of a second node;

instruct, using the one or more processors, the one or more intermediate nodes to store a routing decision each time one of the one or more intermediate nodes receives the setup packet en route to the second node;

instruct, using the one or more processors, a second plane of the NoC to transmit data utilizing a Guaranteed Traffic service from the output port of the first node to the input port of the second node according to the routing decision stored in the one or more intermediate nodes subsequent to the setup packet reaching the second node; and instruct, using the one or more processors, the NoC to transmit a tear-down packet from the output port of the first node to the input port of the second node when transmission of the data is complete.

14. The machine-readable medium of claim 13, comprising instructions to instruct, using the one or more processors, the one or more intermediate nodes to erase the routing decision each time one of the one or more intermediate nodes receives the tear-down packet en route to the second node.

15. A Network-on-Chip (NoC) operating on a programmable integrated circuit device, comprising:

a first node comprising an input port;

a second node communicatively coupled to the first node via a first plane and a second plane, wherein the second node comprises an output port and the second node:

determines initial routing decisions from memories which are initialized prior to normal operation of the NoC;

transmits a setup packet used to dictate routing decisions of the second plane from the output port of the second node through ports of one or more intermediate nodes to the input port of the first node via the first plane based at least in part on the initial routing decisions, wherein each of the one or more intermediate nodes stores one or more of the routing decisions when the setup packet is received;

transmits data from the output port of the second node to the input port of the first node via the second plane according to the routing decisions stored in the one or more intermediate nodes via the second plane after the setup packet is received by the second node; and transmits a tear-down packet from the output port of the second node to the input port of the first node after transmission of the data is completed.

16. The NoC of claim 15, wherein each of the one or more intermediate nodes erases the routing decision when the tear-down packet is received.

17. The NoC of claim 15, wherein:

activity on the first plane affects activity on the second plane;

the second node transmits the tear-down packet via the first plane, the second plane, or both;

the setup packet comprises addresses of at least some of the one or more intermediate nodes;

the tear-down packet comprises address of at least some of the one or more intermediate nodes; or any combination thereof.

* * * * *